US008510506B2

(12) United States Patent
Kaneko

(10) Patent No.: US 8,510,506 B2
(45) Date of Patent: Aug. 13, 2013

(54) DISK ARRAY DEVICE, DISK ARRAY SYSTEM AND CACHE CONTROL METHOD

(75) Inventor: Yuji Kaneko, Tokyo (JP)

(73) Assignee: NEC Corporation, Tokyo (JP)

(*) Notice: Subject to any disclaimer, the term of this patent is extended or adjusted under 35 U.S.C. 154(b) by 128 days.

(21) Appl. No.: 13/044,648

(22) Filed: Mar. 10, 2011

(65) Prior Publication Data

US 2011/0225358 A1   Sep. 15, 2011

(30) Foreign Application Priority Data

Mar. 15, 2010 (JP) .............................. JP2010-058055

(51) Int. Cl.
*G06F 12/00* (2006.01)
*G06F 13/00* (2006.01)
*G06F 13/28* (2006.01)

(52) U.S. Cl.
USPC ........... 711/113; 711/154; 711/162; 711/142; 711/170; 711/118; 710/52; 714/4.11

(58) Field of Classification Search
USPC ......................................................... 711/113
See application file for complete search history.

(56) References Cited

U.S. PATENT DOCUMENTS

| | | | | |
|---|---|---|---|---|
| 5,155,835 A * | 10/1992 | Belsan | ........................... | 711/114 |
| 6,601,134 B1 * | 7/2003 | Yamagami et al. | ........... | 711/111 |
| 7,043,603 B2 * | 5/2006 | Mori | ............................. | 711/113 |
| 7,120,738 B2 * | 10/2006 | Ninomiya et al. | ............ | 711/113 |
| 7,287,137 B2 * | 10/2007 | Ji et al. | ......................... | 711/162 |
| 2004/0010659 A1 * | 1/2004 | Inoue | ............................ | 711/113 |
| 2004/0139365 A1 * | 7/2004 | Hosoya | ............................ | 714/5 |

FOREIGN PATENT DOCUMENTS

JP          2005115603 A       4/2005

* cited by examiner

*Primary Examiner* — Christian P Chace
*Assistant Examiner* — Prasith Thammavong

(57) ABSTRACT

The invention proposes a disk array device that can improve response performance while maintaining data consistency even in the case a write request is received from a host device by a controller that does not have master authority. The disk array device includes a master controller and a slave controller. Upon adding identifying information indicating that write data has been stored in a buffer memory to the write request, the slave controller transmits, to the master controller, the write request to which the identifying information has been added as well as the write data. After having stored the write data, the master controller transmits the write request to which the identifying information has been added to the slave controller. Upon receiving the write request, the slave controller alters the attributes of the buffer memory where the write data has been stored, from the buffer memory to the cache memory.

3 Claims, 4 Drawing Sheets

DISK ARRAY DEVICE, DISK ARRAY SYSTEM AND CACHE CONTROL METHOD

This application is based upon and claims the benefit of priority from Japanese patent application No. 2010-58055, filed on Mar. 15, 2010, the disclosure of which is incorporated herein in its entirety by reference.

BACKGROUND

The present invention relates to a disk array device, a disk array system and a cache control method.

Disk array devices frequently employ a duplicate (redundant) internal configuration for the purpose of improving disaster tolerance. The duplication of controllers as in the disk array device shown in FIG. 1 or the storage device controller indicated in Japanese Patent Application Laid-open No. 2005-115603 is an example of duplicating a disk array device. As a result of employing such a configuration, even if a failure should occur in a prescribed portion of the disk array device, the disk array device is able to continue to operate and enable prompt repair.

A disk array system 100 shown in FIG. 1 has a configuration in which a disk array device 2' is connected with a host device 1 via a network, and the disk array 2' has duplicate controllers 3'M and 3'S therein. Each of the controllers 3'M and 3'S respectively has cache memories 5'M and 5'S for temporarily storing data, and employs a functional configuration respectively having I/O transmission/reception units 4'M and 4'S for transmitting and receiving data and the like to and from the host device 1, and cache memory control units 7'M and 7'S for controlling input and output of data in the cache memories 5'M and 5'S.

In this disk array system 100, write requests cannot be simultaneously transmitted to the cache memory control unit 7'M of the master controller 3'M and the cache memory control unit 7'S of the slave controller 3'S. This is because if write requests are transmitted simultaneously, both write requests end up crossing between the controllers 3'M and 3'S, resulting in different data being stored in their respective cache memories 5'M and 5'S. Consequently, there is a high possibility of the occurrence of data mismatch between the cache memories 5'M and 5'S, resulting in an increased likelihood of loss of data consistency.

Therefore, in this conventional disk array system 100, in the case of designating one of the controllers as the master controller 3'M having master authority for controlling the other controller and designating the other controller as the slave controller 3'S, the procedure by which write data is written to the cache memories 5'M and 5'S is carried out in the manner described below in order to maintain consistency of write data transmitted from the host device 1.

First, in the case the I/O transmission/reception unit 4'M of the master controller 3'M has received a write request from the host device 1 (S1), the I/O transmission/reception unit 4'M of the master controller 3'M determines that its own controller has master authority and transmits the write request to the cache control unit 7'M of the master controller 3'M (S2). When the cache control unit 7'M of the master controller 3'M receives the write request, the cache control unit 7'M of the master controller 3'M stores write data transmitted from the host device 1 following the write request to the cache memory 5'M via the I/O transmission/reception unit 4'M of the master controller 3'M (S3).

Subsequently, the cache control unit 7'M of the master controller 3'M transmits the write request to the cache control unit 7'S of the slave controller 3'S (S4), and transmits write data stored in the cache memory 5'M of the master controller 3'M to the cache memory 5'S of the slave controller 3'S (S5). When the cache control unit 7'S of the slave controller 3'S stores write data in the cache memory 5'S, a write data storage completion report is transmitted to the cache control unit 7'M of the master controller 3'M (S6). The cache control unit 7'M of the master controller 3'M transmits the storage completion report to the I/O transmission/reception unit 4'M of the master controller 3'M (S7), and the I/O transmission/reception unit 4'M of the master controller 3'M transmits the storage completion report to the host device 1 (S8).

On the other hand, in the case the I/O transmission/reception unit 4'S of the slave controller 3'S has received a write request from the host device 1, write data is written to the cache memories 5'M and 5'S as shown in FIG. 2.

First, in the case the I/O transmission/reception unit 4'S of the slave controller 3'S has received a write request from the host device 1 (S11), if the I/O transmission/reception unit 4'S of the slave controller 3'S determines that its own controller does not have master authority, the I/O transmission/reception unit 4'S of the slave controller 3'S transmits the write request to the cache control unit 7'M of the master controller 3'M (S12). In addition, if the I/O transmission/reception unit 4'S of the slave controller 3'S receives write data from the host 1, the I/O transmission/reception unit 4'S of the slave controller 3'S transmits the received write data to the cache control unit 7'M of the master controller 3'M.

When the cache control unit 7'M of the master controller 3'M receives the write request, the cache control unit 7'M of the master controller 3'M stores write data transmitted following the write request to the cache memory 5'M (S13). Subsequently, the cache control unit 7'M of the master controller 3'M transmits the write request to the cache control unit 7'S of the slave controller 3'S (S14), and transmits the write data stored in the cache memory 5'M of the master controller 3'M to the cache memory 5'S of the slave controller 3'S (S15).

When the cache control unit 7'S of the slave controller 3'S stores the write data in the cache memory 5'S, the cache control unit 7'S of the slave controller 3'S transmits a write data storage completion report to the cache control unit 7'M of the master controller 3'M (S16). The cache control unit 7'M of the master controller 3'M transmits the storage completion report to the I/O transmission/reception unit 4'S of the slave controller 3'S (S17), and the I/O transmission/reception unit 4'S of the slave controller 3'S transmits the storage completion report to the host device 1 (S18).

In this manner, in the case the slave controller not having master authority has received a write request during execution of write processing in a disk array device, the slave controller must again receive a write request and write data from a master controller after having already transmitted the write request and write data to the master controller, thereby resulting in unnecessary data transfer.

In addition, in the case of a disk array system in which duplicate controllers are provided with a common cache memory, although the problem of unnecessary data transfer as described above does not occur, it is necessary to maintain consistency of write data by carrying out duplicate writing after each controller has carried out locking (exclusive control) on different storage areas within the cache memory. Since this locking processing requires time, as a result thereof, a large amount of time is required for writing processing thereby causing a decrease in response performance.

SUMMARY

An exemplary object of the invention is to provide a disk array device, a disk array system and a cache control method that can improve response performance while maintaining data consistency even in the case a write request is received from a host device by a controller that does not have master authority.

A disk array device according to an exemplary aspect of the invention is a disk array device that controls duplicate writing to a cache memory carried out by a master controller and a slave controller, wherein the master controller is provided with a master I/O unit, a master cache memory and a master cache control unit, the slave controller is provided with a slave I/O unit, a slave cache memory, a buffer memory that is caused to function as the cache memory by altering memory attributes, and a slave cache control unit, the slave I/O unit stores write data in the buffer memory and transmits, to the master controller, a write request to which has been added identifying information indicating that the write data has been stored in the buffer memory, as well as the write data in the case of receiving the write request and the write data from a host device, the master cache control unit stores the write data in the master cache memory and transmits the write request to which the identifying information has been added to the slave controller in the case of receiving the write request to which the identifying information has been added, along with the write data, and the slave cache control unit alters the attributes of the buffer memory where the write data has been stored to cause the buffer memory to function as the cache memory in the case of receiving, from the master controller, the write request to which the identifying information has been added.

A disk array system according to an exemplary aspect of the invention is a disk array system that provided with a host device, and a disk array device configured so as to be communicable with the host device that controls duplicate writing to a cache memory carried out by a master controller and a slave controller, wherein the master controller is provided with a master I/O unit, a master cache memory and a master cache control unit, the slave controller is provided with a slave I/O unit, a slave, cache memory, a buffer memory that is caused to function as the cache memory by altering memory attributes, and a slave cache control unit, the slave I/O unit stores write data in the buffer memory and transmits, to the master controller, a write request to which has been added identifying information indicating that the write data has been stored in the buffer memory, as well as the write data in the case of receiving the write request and the write data from the host device, the master cache control unit stores the write data in the master cache memory and transmits the write request to which the identifying information has been added to the slave controller in the case of receiving the write request to which the identifying information has been added, along with the write data, and the slave cache control unit alters the attributes of the buffer memory where the write data has been stored to cause the buffer memory to function as the cache memory in the case of receiving, from the master controller, the write request to which the identifying information has been added.

Moreover, A cache control method of a disk array device according to an exemplary aspect of the invention is a cache control method that controls duplicate writing to a cache memory carried out by a master controller and a slave controller, the master controller being provided with a master I/O unit, a master cache memory and a master cache control unit, and the slave controller being provided with a slave I/O unit, a slave cache memory, a buffer memory that is caused to function as the cache memory by altering memory attributes, and a slave cache control unit, wherein the slave I/O unit executes a step of receiving a write request and write data from a host device, a step of storing the write data in the buffer memory, and a step of transmitting, to the master controller, the write request to which has been added identifying information indicating that the write data has been stored in the buffer memory, as well as the write data, the master cache control unit executes a step of receiving the write request to which the identifying information has been added, along with the write data, a step of storing the write data in the master cache memory, and a step of transmitting the write request to which the identifying information has been added to the slave controller, and the slave cache control unit executes a step of receiving, from the master controller, the write request to which the identifying information has been added, and a step of altering the attributes of the buffer memory where the write data has been stored to cause the buffer memory to function as the cache memory.

According to the present invention, in a disk array device in which controllers have been duplicated, the cache memory as well as the buffer memory are installed in a controller not having master authority, and attributes of the buffer memory are able to be altered (switched) to those of the cache memory. Consequently, even in the case a write request is received from a host device by a controller that does not have master authority, data consistency can be maintained while avoiding unnecessary data transfer between controllers. As a result, processing time of write processing of the disk array device is reduced, thereby improving response performance.

EXEMPLARY EMBODIMENT

Figure 3:
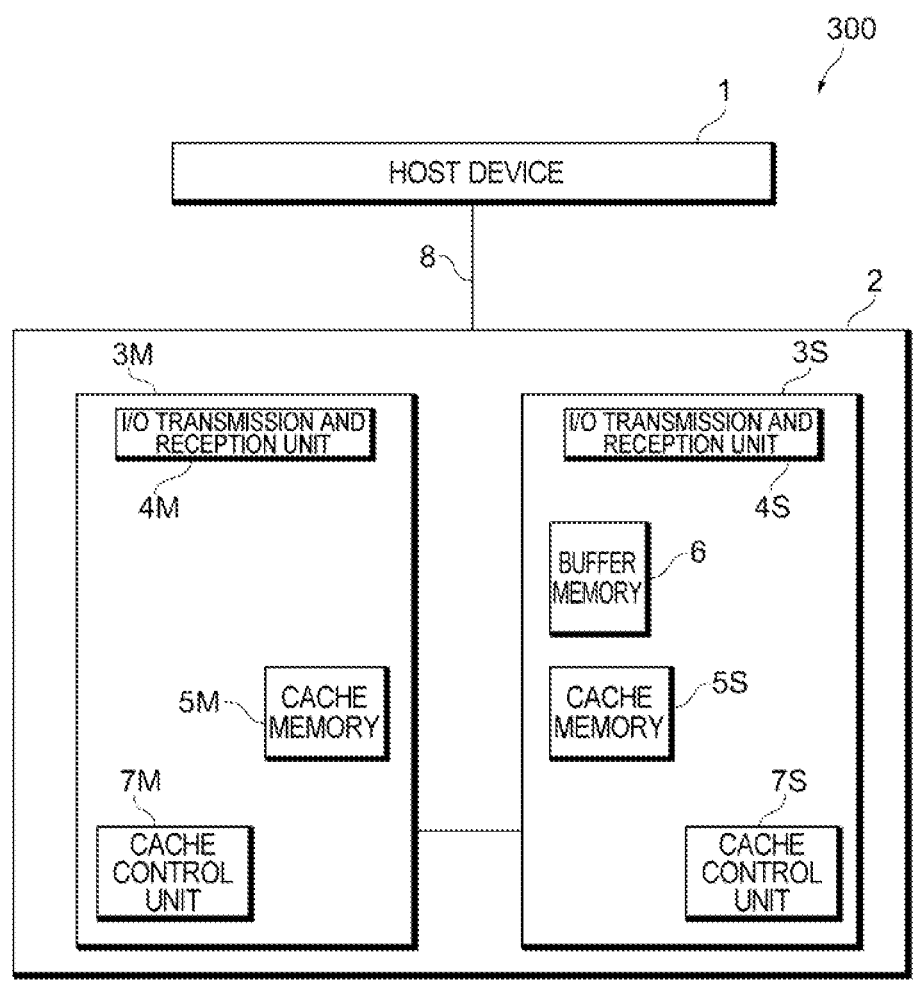
FIG. 3 is a block diagram showing an example of the configuration of a disk array system 300.

The following provides an explanation of embodiments of the present invention with reference to the drawings. Furthermore, in the drawings, the same reference symbols are used to indicate the same constituents and duplicate explanations thereof are omitted. In addition, the following embodiments are examples used to explain the present invention, and are not intended to limit the present invention thereto. Moreover, the present invention can be modified in various ways provided the modifications do not deviate from the gist thereof.
(1) Configuration of Disk Array System FIG. 3 is a block diagram showing the configuration of a disk array system 300 according to the present embodiment. The disk array system 300 has a host device 1 that serves as a central processing unit and is communicably connected with a disk array device 2 via a first communication line 8.

The host device 1 is provided with hardware similar to that of an ordinary computer device, such as a CPU (not shown), memory connected to a bus (not shown), input unit (not shown), output unit (not shown) and input/output interface (not shown). The host device 1 may physically be a dedicated system or general-purpose information processing device. For example, an information processing device having an ordinary configuration can be caused to operate as the host device 1 of the present embodiment by executing software that defines processing for a writing method to be described later.

The disk array device 2 has duplicate controllers 3M and 3S, and each controller 3M and each controller 3S is mutually communicably connected. Among each of the controllers 3M and 3S, the controller 3M is a master controller having master authority for controlling the other controller 3S, while the controller 3S is a slave controller not having master authority.

Each controller 3M and 3S of the disk array device 2 is provided with hardware such as a microprocessor (not shown), memory connected to a bus (not shown), cache memories 5M and 5S, an input unit (not shown), an output unit (not shown), an input/output interface (not shown) and an HDD controller (not shown). The microprocessor, memory, cache memories 5M and 5S, input unit, output unit, input/output interface and HDD controller are connected to a plurality of hard disks via a second communication line (not shown).

The cache memories 5M and 5S provided in the controllers 3M and 3S are memories installed for improving reading and writing performance, and are for temporarily storing write data and read data.

In addition, the slave controller 3S is configured to be further provided with a buffer memory 6 in addition to the hardware previously described. This buffer memory 6 is a second memory installed in the slave controller 3S in addition to the cache memory 5S, and is for temporarily storing write data transmitted from the host device 1.

In addition, the disk array device 2 manages one or more hard disks as one or more logical disks. A logical disk indicates a single virtual storage area formed by grouping storage areas composed by a single hard disk, or a single virtual storage area formed by grouping partitioned storage areas obtained by dividing the storage area of a single hard disk into a plurality of areas.

Each of the controllers 3M and 3S of the disk array device 2 functionally includes I/O transmission and reception units (I/O units) 4M and 4S and cache control units 7M and 7S. The I/O transmission and reception units 4M and 4S and the cache control units 7M and 7S may mainly be realized by a microprocessor executing a program stored in memory and controlling each hardware, and for example, may be realized with a general-purpose integrated circuit in the manner of a RAID chip.

Here, the I/O transmission and reception units 4M and 4S receive write requests, write data, read requests and the like transmitted from the host device 1, and transmit read data and the like.

In addition, the I/O transmission and reception unit 4S of the slave controller 3S temporarily stores write data transmitted from the host device 1 in the buffer memory 6 in addition to carrying out the functions described above. Moreover, in the case write data transmitted from the host device 1 has been temporarily stored in the buffer memory 6, the I/O transmission and reception unit 4S of the slave controller 3S adds identifying information indicating that write data has been temporarily stored in the buffer memory 6 to the write request, and transmits the write request to the cache control unit 7M of the master controller 3M.

The cache control units 7M and 7S primarily manage data attribute information and location information stored on a hard disk by controlling input and output of data to and from the cache memories 5M and 5S. In addition, the cache control units 7M and 7S manage data attribute information and location information temporarily stored in the cache memories 5M and 5S or buffer memory 6, and manage the attributes of each memory 5M, 5S and 6. Data stored in the cache memories 5M and 5S or buffer memory 6 is stored in partitioned storage areas referred to as pages obtained by dividing the storage area of the cache memories 5M and 5S or buffer memory 6 into prescribed storage areas.

Incidentally, a storage area network (SAN) is mainly used for the first communication line 8, while an HDD access line such as a fibre channel (FC), serial attached SCSI (SAS), serial ATA (SATA), USB or IEEE1394 is used for the second communication line (not shown).

Figure 4:
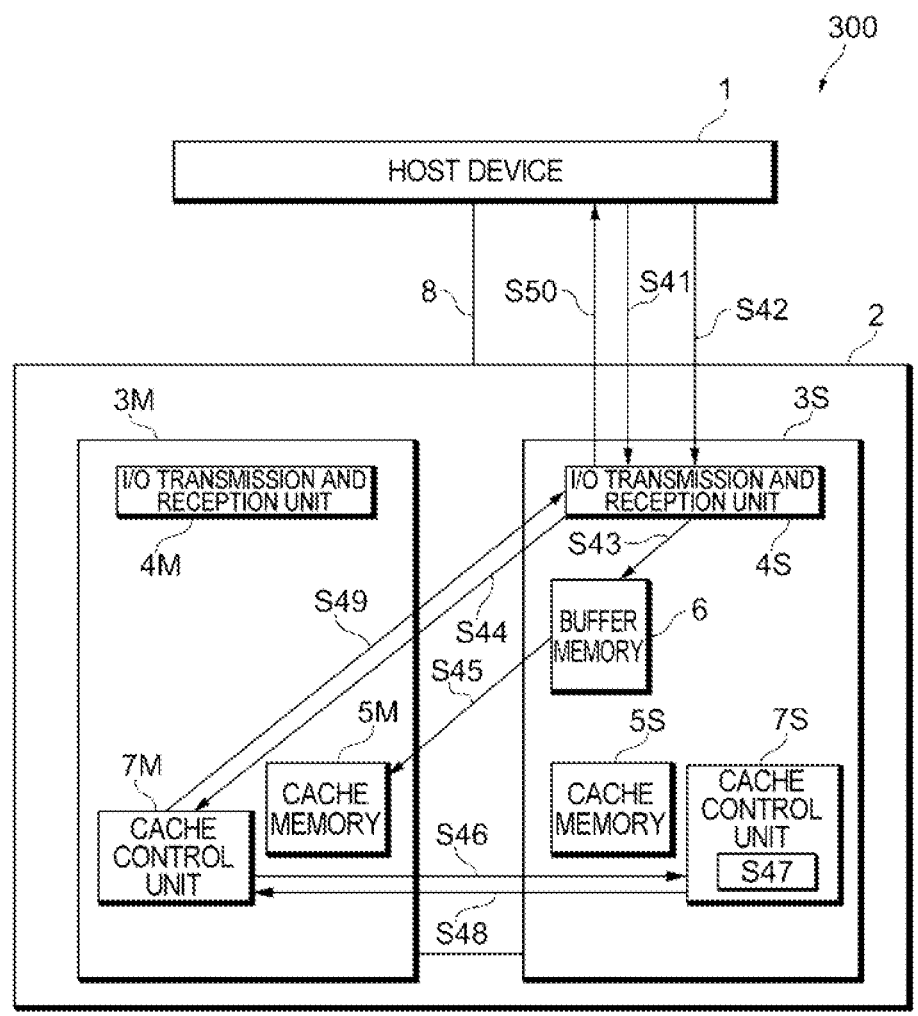
FIG. 4 is an explanatory drawing showing an example of a writing procedure of a disk array system 300.

In the disk array system 300 configured in this manner, duplicate writing of cache memories 5M and 5S in the case the slave controller 3S receives a write request and write data from the host device 1 is explained using the explanatory drawing shown in FIG. 4.

First, in the case the I/O transmission and reception unit 4S of the slave controller 3S has received a write request from the host device 1 (S41), the I/O transmission and reception unit 4S of the slave controller 3S determines whether or not its own controller has the cache control unit 7M of the master controller 3M, namely, whether or not its own controller has master authority. If the I/O transmission and reception unit 4S of the slave controller 3S determines that its own controller does not have master authority, the I/O transmission and reception unit 4S of the slave controller 3S receives write data subsequently transmitted from the host device 1 (S42), and stores the received write data in a prescribed page of the buffer memory 6 (S43).

When the I/O transmission and reception unit 4S of the slave controller 3S adds an identifier to the write request as identifying information indicating that write data has been stored in a prescribed page of the buffer memory 6, the I/O transmission and reception unit 4S transmits, to the cache control unit 7M of the master controller 3M, the write request to which the identifying information has been added as well as write data (S44).

When the cache control unit 7M of the master controller 3M receives the write request to which the identifying information has been added along with the write data, the cache control unit 7M of the master controller 3M stores the received write data in a prescribed page of the cache memory 5M (S45). Subsequently, the cache control unit 7M of the master controller 3M transmits the write request to which the identifying information has been added to the cache control unit 7S of the slave controller 3S (S46). The write request transmitted to the cache control unit 7S of the slave controller 3S contains instructions for altering the attributes of the buffer memory 6.

When the cache control unit 7S of the slave controller 3S receives the write request to which the identifying information has been added, the cache control unit 7S of the slave controller 3S alters the attributes of the memory where the write data is stored (S47). More specifically, the cache control unit 7S of the slave controller 3S alters the attributes of the buffer memory 6 where the write data is stored to attributes of the cache memory 5S. As a result, the buffer memory 6 can be used as the cache memory 5S.

When alteration of the attributes of the memory where the write data is stored is completed, the cache control unit 7S of the slave controller 3S transmits a completion report indicating that duplicate writing processing of write data has been completed to the cache control unit 7M of the master controller 3M (S48).

When the cache control unit 7M of the master controller 3M receives the completion report, the cache control unit 7M of the master controller 3M transmits that completion report to the I/O transmission and reception unit 4S of the slave controller 3S (S49).

When the I/O transmission and reception unit 4S of the slave controller 3S receives the completion report, the I/O transmission and reception unit 4S of the slave controller 3S transmits the completion report to the host device 1 (S50), and duplicate writing processing of the cache memories 5M and 5S ends.

Figure 1:
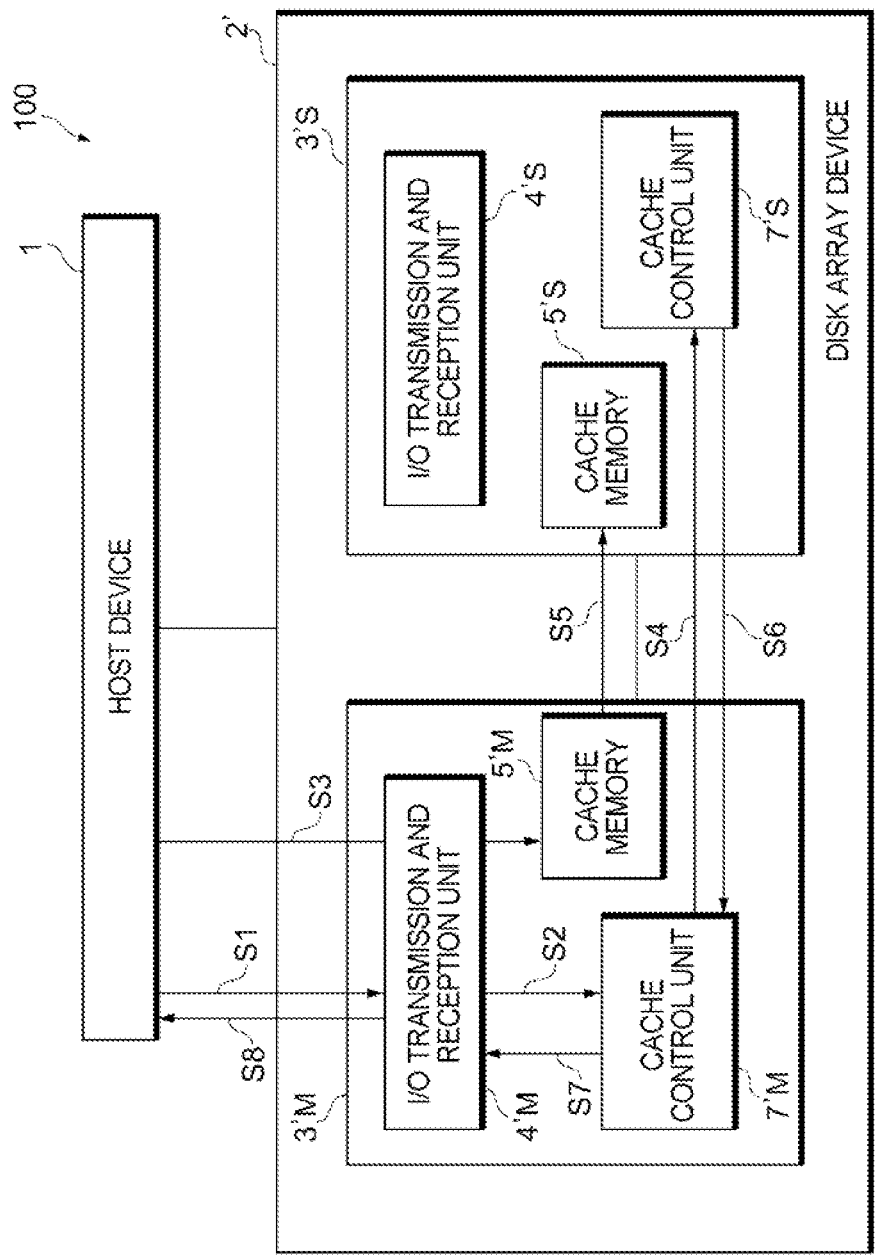
FIG. 1 is a block diagram showing an example of a writing procedure of a disk array system 100.
Figure 2:
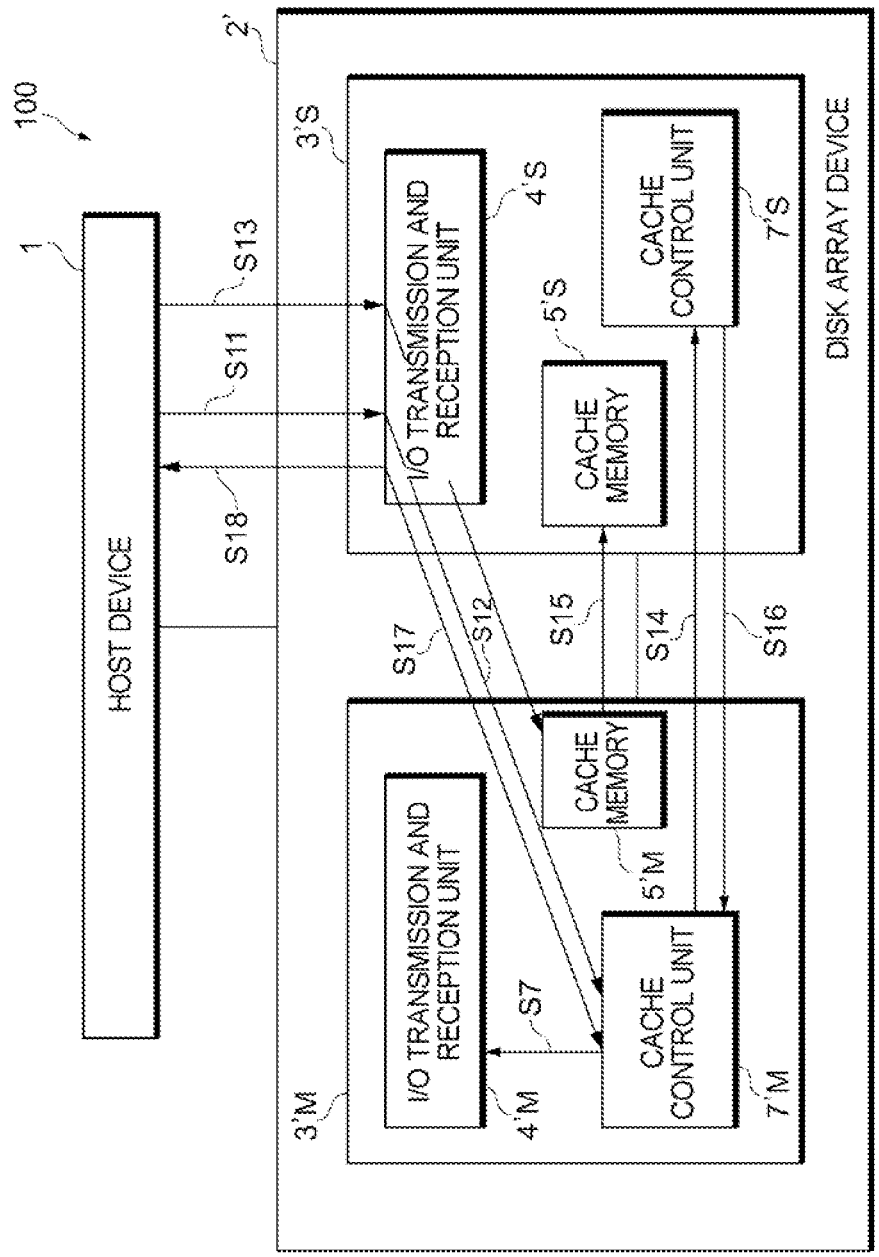
FIG. 2 is a block diagram showing an example of a writing procedure of a disk array system 100.

Although the following provides an explanation of duplicate writing processing of the cache memories 5M and 5S in the case the I/O transmission and reception unit 4M of the master controller 3M receives a write request and write data transmitted from the host device 1, it is the same as the duplicate writing processing explained in FIG. 1.

First, when receiving a write request from the host device 1, the I/O transmission and reception unit 4M of the master controller 3M determines that its own controller has master authority, and as a result, the I/O transmission and reception unit 4M of the master controller 3M transmits the write request along with write data subsequently transmitted from the host device 1 to the cache control unit 7M. The cache control unit 7M stores the write data in the cache memory 5M.

Subsequently, the cache control unit 7M of the master controller 3M transmits the write request to the cache control unit 7S of the slave controller 3S, and transmits the write data stored in the cache memory 5M of the master controller 3M to the cache memory 5S of the slave controller 3S. When the cache control unit 7S of the slave controller 3S stores the write data in the cache memory 5S, the cache control unit 7S of the slave controller 3S transmits a write data storage completion report to the cache control unit 7M of the master controller 3M. The cache control unit 7M of the master controller 3M transmits the storage completion report to the I/O transmission and reception unit 4M, and the I/O transmission and reception unit 4M transmits the storage completion report to the host device 1, thereby completing duplicate writing processing of the cache memories 5M and 5S.

An exemplary advantage according to the invention is that, in the case a write request and write data transmitted from the host device 1 have been received by the slave controller 3S, the slave controller 3S transmits, to the master controller 3M, the write request to which identifying information has been added, along with the write data, and the master controller 3M transmits only the write request to which the identifying information has been added to the slave controller 3S. Consequently, according to the present embodiment, transfer of write data between the controllers 3M and 3S is only required to be carried out once.

In addition, an exemplary advantage according to the invention is that, in the case the slave controller 3S has received only a write request to which identifying information has been added from the master controller 3M, since the attributes of the buffer memory 6 where the write data is stored is only required to be altered to the attributes of the cache memory 5S, the number of times of copying write data in the slave controller 3S can be reduced.

An exemplary advantage according to the invention is that data consistency can be maintained while avoiding unnecessary data transfer between the controllers 3M and 3S. As a result, processing time of write processing is reduced, thereby improving response performance.

The present invention can be widely applied to disk array systems used for the purpose of maintaining data consistency while improving response performance.

The whole or part of the exemplary embodiments disclosed above can be described as, but not limited to, the following supplementary notes.

(Supplementary note 1) A disk array device that controls duplicate writing to a cache memory carried out by a master controller and a slave controller, wherein the master controller is provided with a master I/O unit, a master cache memory and a master cache control unit, the slave controller is provided with a slave I/O unit, a slave cache memory, a buffer memory that is caused to function as the cache memory by altering memory attributes, and a slave cache control unit, the slave I/O unit stores write data in the buffer memory and transmits, to the master controller, a write request to which has been added identifying information indicating that the write data has been stored in the buffer memory, as well as the write data in the case of receiving the write request and the write data from a host device, the master cache control unit stores the write data in the master cache memory and transmits the write request to which the identifying information has been added to the slave controller in the case of receiving the write request to which the identifying information has been added, along with the write data, and the slave cache control unit alters the attributes of the buffer memory where the write data has been stored to cause the buffer memory to function as the cache memory in the case of receiving, from the master controller, the write request to which the identifying information has been added.

(Supplementary note 2) A disk array system, including:

a host device; and a disk array device configured so as to be communicable with the host device that controls duplicate writing to a cache memory carried out by a master controller and a slave controller, wherein the master controller is provided with a master I/O unit, a master cache memory and a master cache control unit, the slave controller is provided with a slave I/O unit, a slave cache memory, a buffer memory that is caused to function as the cache memory by altering memory attributes, and a slave cache control unit, the slave I/O unit stores write data in the buffer memory and transmits, to the master controller, a write request to which has been added identifying information indicating that the write data has been stored in the buffer memory, as well as the write data in the case of receiving the write request and the write data from the host device, the master cache control unit stores the write data in the master cache memory and transmits the write request to which the identifying information has been added to the slave controller in the case of receiving the write request to which the identifying information has been added, along with the write data, and the slave cache control unit alters the attributes of the buffer memory where the write data has been stored to cause the buffer memory to function as the cache memory in the case of receiving, from the master controller, the write request to which the identifying information has been added.

(Supplementary note 3) A cache control method of a disk array device that controls duplicate writing to a cache memory carried out by a master controller and a slave controller, the master controller being provided with a master I/O unit, a master cache memory and a master cache control unit, and the slave controller being provided with a slave I/O unit, a slave cache memory, a buffer memory that is caused to function as the cache memory by altering memory attributes, and a slave cache control unit, wherein the slave I/O unit executes a step of receiving a write request and write data from a host device, a step of storing the write data in the buffer memory, and a step of transmitting, to the master controller, the write request to which has been added identifying information indicating that the write data has been stored in the buffer memory, as well as the write data, the master cache control unit executes a step of receiving the write request to which the identifying information has been added, along with the write data, a step of storing the write data in the master cache memory, and a step of transmitting the write request to which the identifying information has been added to the slave controller, and the slave cache control unit executes a step of receiving, from the master controller, the write request to which the identifying information has been added, and a step of altering the attributes of the buffer memory where the write data has been stored to cause the buffer memory to function as the cache memory.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A disk array device that controls duplicate writing to a cache memory carried out by a master controller and a slave controller, wherein the master controller is provided with a master I/O unit, a master cache memory and a master cache control unit, the slave controller is provided with a slave I/O unit, a slave cache memory, a buffer memory that is caused to function as the cache memory by altering memory attributes, and a slave cache control unit, the slave I/O unit stores write data in the buffer memory and transmits the write data and a write request to the master controller responsive to the slave I/O unit receiving the write request and the write data from a host device, the write request to which has been added identifying information indicating that the write data has been stored in the buffer memory, the master cache control unit stores the write data in the master cache memory and transmits the write request to which the identifying information has been added to the slave controller in the case of receiving the write request to which the identifying information has been added, along with the write data, and the slave cache control unit alters the attributes of the buffer memory where the write data has been stored to cause the buffer memory to function as the cache memory in the case of receiving, from the master controller, the write request to which the identifying information has been added.

2. A disk array system, comprising:

a host device; and a disk array device configured so as to be communicable with the host device that controls duplicate writing to a cache memory carried out by a master controller and a slave controller, wherein the master controller is provided with a master I/O unit, a master cache memory and a master cache control unit, the slave controller is provided with a slave I/O unit, a slave cache memory, a buffer memory that is caused to function as the cache memory by altering memory attributes, and a slave cache control unit, the slave I/O unit stores write data in the buffer memory and transmits the write data and a write request to the master controller responsive to the slave I/O unit receiving the write request and the write data from a host device, the write request to which has been added identifying information indicating that the write data has been stored in the buffer memory, the master cache control unit stores the write data in the master cache memory and transmits the write request to which the identifying information has been added to the slave controller in the case of receiving the write request to which the identifying information has been added, along with the write data, and the slave cache control unit alters the attributes of the buffer memory where the write data has been stored to cause the buffer memory to function as the cache memory in the case of receiving, from the master controller, the write request to which the identifying information has been added.

3. A cache control method of a disk array device that controls duplicate writing to a cache memory carried out by a master controller and a slave controller, the master controller being provided with a master I/O unit, a master cache memory and a master cache control unit, and the slave controller being provided with a slave I/O unit, a slave cache memory, a buffer memory that is caused to function as the cache memory by altering memory attributes, and a slave cache control unit, wherein the slave I/O unit executes a step of receiving a write request and write data from a host device, a step of storing the write data in the buffer memory, and a step of transmitting the write data and a write request to the master controller responsive to the slave I/O unit receiving the write request and the write data from a host device, the write request to which has been added identifying information indicating that the write data has been stored in the buffer memory, the master cache control unit executes a step of receiving the write request to which the identifying information has been added, along with the write data, a step of storing the write data in the master cache memory, and a step of transmitting the write request to which the identifying information has been added to the slave controller, and the slave cache control unit executes a step of receiving, from the master controller, the write request to which the identifying information has been added, and a step of altering the attributes of the buffer memory where the write data has been stored to cause the buffer memory to function as the cache memory.

* * * * *